(12) United States Patent
Chiang et al.

(10) Patent No.: US 10,503,333 B2
(45) Date of Patent: Dec. 10, 2019

(54) TOUCH PANEL

(71) Applicant: HENGHAO TECHNOLOGY CO., LTD, Hsin-chu County (TW)

(72) Inventors: Tzu-Jung Chiang, Taoyuan (TW);
Shan-Chen Huang, Taoyuan (TW);
Yung-Chih Liu, Taichung (TW);
Ching-Fang Wong, Taichung (TW)

(73) Assignee: HENGHAO TECHNOLOGY CO., LTD, Hsin-chu County (TW)

( * ) Notice: Subject to any disclaimer, the term of this patent is extended or adjusted under 35 U.S.C. 154(b) by 0 days.

(21) Appl. No.: 15/846,141

(22) Filed: Dec. 18, 2017

(65) Prior Publication Data

US 2018/0173344 A1    Jun. 21, 2018

Related U.S. Application Data

(60) Provisional application No. 62/435,859, filed on Dec. 19, 2016.

(30) Foreign Application Priority Data

Sep. 30, 2017   (TW) .............................. 106133857 A

(51) Int. Cl.
*G06F 3/044* (2006.01)
*G06F 1/16* (2006.01)

(52) U.S. Cl.
CPC ............ *G06F 3/044* (2013.01); *G06F 1/1692* (2013.01); *G06F 2203/04103* (2013.01); *G06F 2203/04112* (2013.01)

(58) Field of Classification Search
CPC ......... G06F 1/1692; G06F 2203/04103; G06F 2203/04111; G06F 2203/04112; G06F 3/044
See application file for complete search history.

(56) References Cited

U.S. PATENT DOCUMENTS

2012/0327569 A1\* 12/2012 Park .................. G06F 3/044
361/679.01
2013/0000959 A1\* 1/2013 Park .................. G06F 3/044
174/257
(Continued)

FOREIGN PATENT DOCUMENTS

TW    I463370    12/2014
TW    M518362   3/2016
TW    I560606    12/2016

OTHER PUBLICATIONS

"Office Action of Taiwan Counterpart Application," dated Dec. 12, 2017, p. 1-p. 5.

*Primary Examiner* — Viet D Pham
(74) *Attorney, Agent, or Firm* — JCIPRNET

(57) ABSTRACT

A touch panel including a substrate, first electrodes, second electrodes, and an insulating layer is provided. Each first electrode includes first pad portions and first connection portions, and each first connection portion connects two adjacent first pad portions. Each second electrode includes second pad portions and second connection portions, and each second connection portion connects two adjacent second pad portions. The first electrodes and the second electrodes are located on the same side of the substrate, and the first connection portions and the second connection portions cross each other. The insulating layer is located between the first connection portions and the second connection portions. The first electrodes and the second electrodes include a metal mesh layer and a transparent conductive layer. At least one of the first connection portions and the second connection portions includes the metal mesh layer.

10 Claims, 10 Drawing Sheets

(56) References Cited

U.S. PATENT DOCUMENTS

| | | | |
|---|---|---|---|
| 2015/0075846 A1* | 3/2015 | Yoshiki | G06F 3/045 174/253 |
| 2015/0277643 A1* | 10/2015 | Kim | G06F 1/1626 345/173 |
| 2015/0338562 A1* | 11/2015 | Zhang | G02F 1/133528 257/88 |
| 2015/0378485 A1* | 12/2015 | Nakamura | G09G 3/36 345/174 |

* cited by examiner

TOUCH PANEL

CROSS-REFERENCE TO RELATED APPLICATION

This application claims the priority benefits of U.S. provisional application Ser. No. 62/435,859, filed on Dec. 19, 2016, and Taiwan application serial no. 106133857, filed on Sep. 30, 2017. The entirety of each of the above-mentioned patent applications is hereby incorporated by reference herein and made a part of this specification.

BACKGROUND OF THE INVENTION

1. Field of the Invention

The invention relates to a panel and particularly relates to a touch panel.

2. Description of Related Art

The touch panel has been extensively used in electronic products such as smartphones, tablet personal computers, personal digital assistants (PDA) and laptops due to the convenience of human-machine interaction. Although the touch panels currently on the market have satisfactory performance, demand for more versatile touching ways or more smooth touching operations definitely propels improvements in the sensitivity and detection accuracy of the touch panel.

SUMMARY OF THE INVENTION

The invention discloses a touch panel that has at least good detection accuracy.

The invention of a touch panel includes a substrate, a plurality of first electrodes, a plurality of second electrodes and an insulating layer. The first electrodes are disposed in parallel on the substrate, each of the first electrodes includes a plurality of first pad portions and a plurality of first connection portions, and each of the first connection portions connects two adjacent first pad portions. The second electrodes are disposed in parallel on the substrate, each of the second electrodes includes a plurality of second pad portions and a plurality of second connection portions, and each of the second connection portions connects two adjacent second pad portions. The first electrodes and the second electrodes are located on the same side of the substrate, and the first connection portions and the second connection portions cross each other. The insulating layer is located between the first connection portions and the second connection portions, so the first electrodes and the second electrodes are electrically insulated from each other. The first electrodes and the second electrodes include a metal mesh layer and a transparent conductive layer. At least one of the first connection portions and the second connection portions includes the metal mesh layer.

In one embodiment of the invention, the second connection portions are formed of the metal mesh layer, and the first pad portions, the first connection portions and the second pad portions are formed of the transparent conductive layer.

In one embodiment of the invention, the first electrodes and the second electrodes include two metal mesh layers and the transparent conductive layer. The second connection portions are formed of one of the two metal mesh layers, and the first pad portions, the first connection portions and the second pad portions are formed by stacking the transparent conductive layer and the other one of the two metal mesh layers.

In one embodiment of the invention, the first pad portions, the first connection portions and the second pad portions are formed of the metal mesh layer, and the second connection portions are formed of the transparent conductive layer.

In one embodiment of the invention, the first electrodes and the second electrodes include two metal mesh layers and the transparent conductive layer. The first pad portions, the first connection portions and the second pad portions are formed of one of the two metal mesh layers, and the second connection portions are formed by stacking the transparent conductive layer and the other one of the two metal mesh layers.

In one embodiment of the invention, a line width of the metal mesh layer falls within a range from 1 μm to 6 μm.

In one embodiment of the invention, an aperture ratio of the metal mesh layer of at least one of the first connection portions and the second connection portions is equal to or less than 95%.

In one embodiment of the invention, an aperture ratio of the metal mesh layer of the first pad portions and the second pad portions is equal to or more than 95%.

In one embodiment of the invention, the touch panel further includes a shielding layer that is disposed on a side of the metal mesh layer.

In one embodiment of the invention, the touch panel further includes a decorative layer that is disposed on the substrate and exposes the first electrodes, the second electrodes and the insulating layer.

In view of the foregoing, for the touch panel according to the embodiments of the invention, the design of at least one of the first connection portions and the second connection portions including the metal mesh layer can decrease the capacitance of an intersection point of the first connection portions and the second connection portions may, and thus contribute to enhance detection accuracy. Accordingly, the touch panel according to the embodiments of the invention has at least good detection accuracy.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
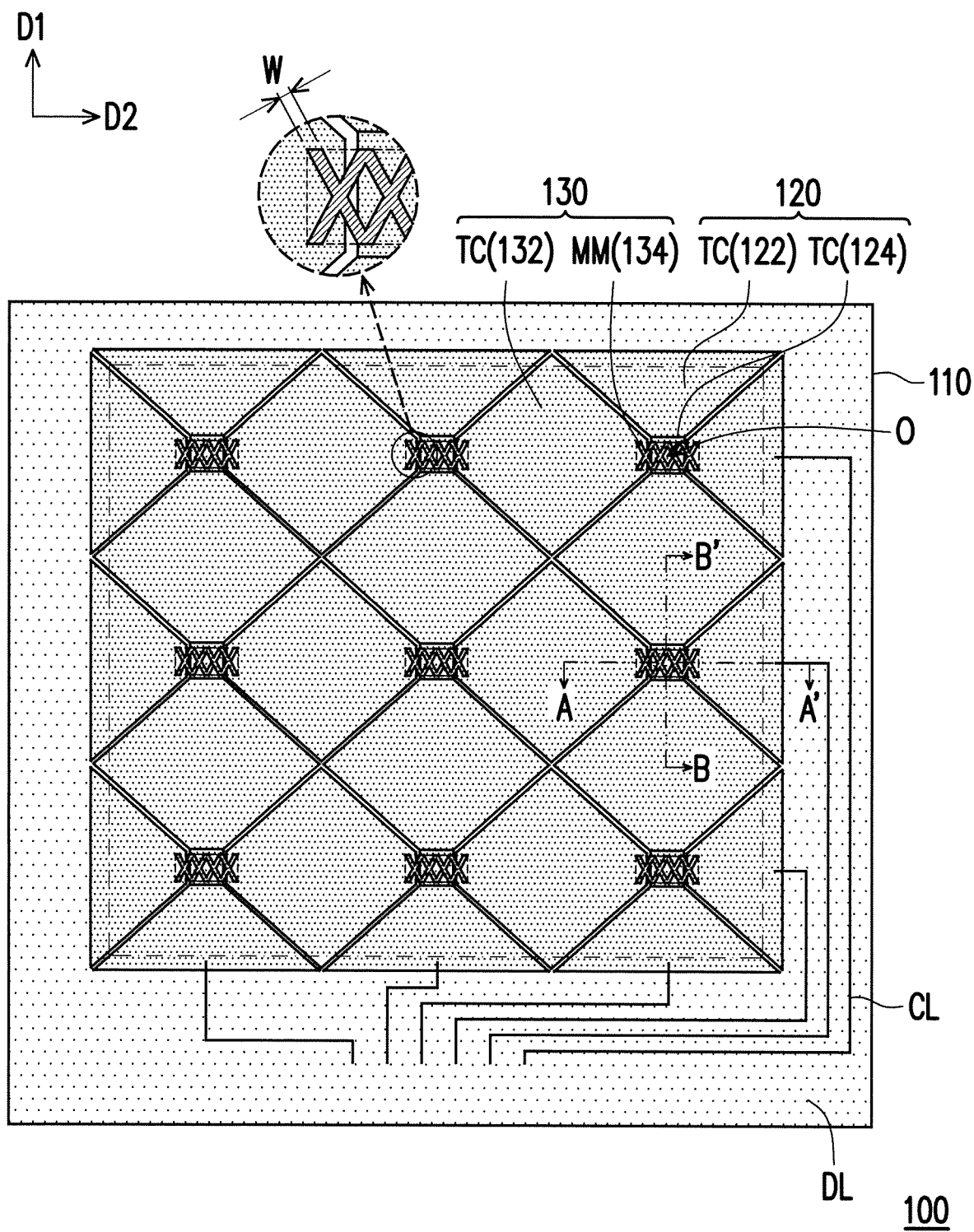
FIG. 1 is a bottom view of a touch panel according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
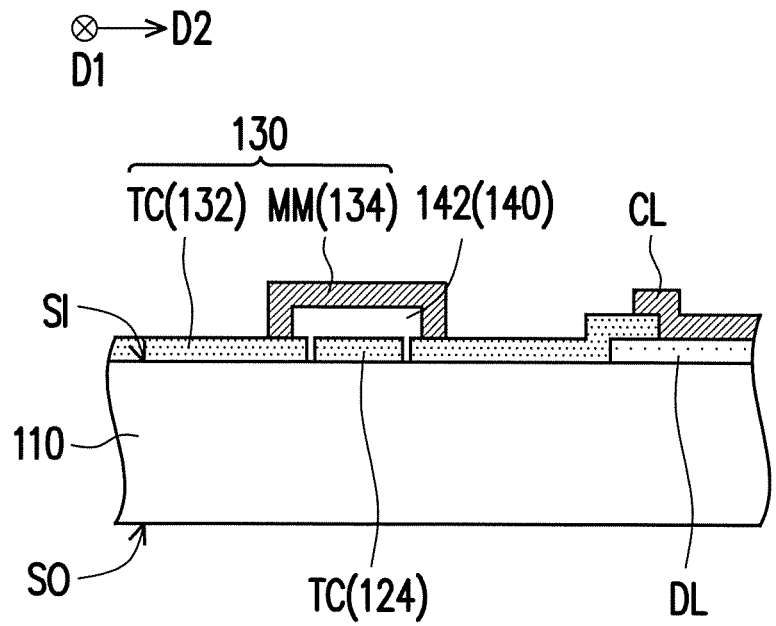
FIGS. 2A and 2B are first cross-sectional views of a section line A-A' and a section line B-B' in FIG. 1 respectively.
Figure 2B:
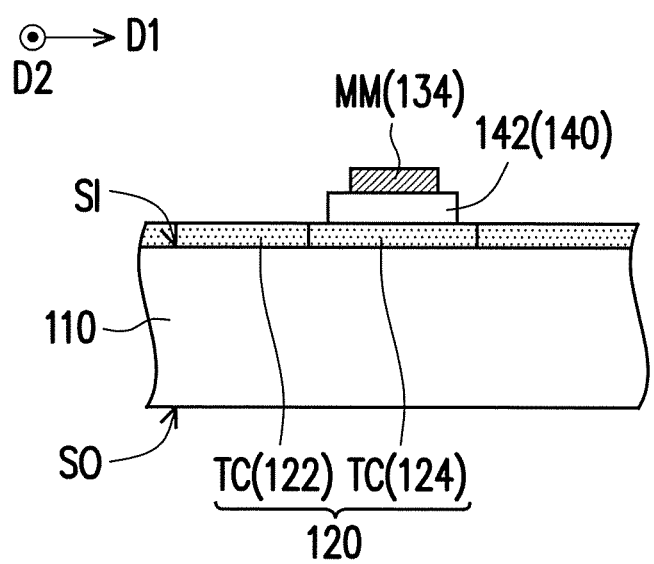

FIG. 1 is a bottom view of a touch panel according to a first embodiment of the invention. FIGS. 2A and 2B are first cross-sectional views of a section line A-A' and a section line B-B' in FIG. 1 respectively.

Referring to FIGS. 1 to 2B, a touch panel 100 according to the first embodiment of the invention includes a substrate 110, a plurality of first electrodes 120, a plurality of second electrodes 130 and an insulating layer 140. In order to clearly indicate the relative positional relationship between the first electrodes 120 and the second electrodes 130, FIG. 1 does not show the insulating layer 140. Therefore, reference is made to FIGS. 2A and 2B concerning the insulating layer 140 according to the first embodiment.

The substrate 110 is a carrier of the first electrodes 120, the second electrodes 130 and the insulating layer 140 and may be a rigid substrate or a flexible substrate. For example, the substrate 110 may be a glass substrate, a ceramic substrate, a plastic substrate, or a composite film. The glass substrate may be a strengthened glass substrate or a non-strengthened glass substrate. The plastic substrate may include, but not limited to, polycarbonate (PC), polyethylene terephthalate (PET), cyclo olefin polymer (COP), polymethylmethacrylate (PMMA) or polyimide (PI).

The first electrodes 120 are disposed in parallel on the substrate 110. For example, the first electrodes 120 extend in a first direction D1 respectively and are arranged in a second direction D2. The first direction D1 and the second direction D2 intersect with each other and are perpendicular to each other, for example, but not limited thereto.

Each of the first electrodes 120 includes a plurality of first pad portions 122 and a plurality of first connection portions 124, and each of the first connection portions 124 connects two adjacent first pad portions 122. Specifically, the first connection portions 124 connect two adjacent first pad portions 122 arranged in the first direction D1 to form the first electrode 120 extending in the first direction D1.

The second electrodes 130 are disposed in parallel on the substrate 110. For example, the second electrodes 130 extend in the second direction D2 respectively and are arranged in the first direction D1.

Each of the second electrodes 130 includes a plurality of second pad portions 132 and a plurality of second connection portions 134, and each of the second connection portions 134 connects two adjacent second pad portions 132. Specifically, the second connection portions 134 connects two adjacent second pad portions 132 arranged in the second direction D2 to form the second electrode 130 extending in the second direction D2.

The touch panel 100 may be, for example, a mutual-capacitance touch panel. One of the first electrodes 120 and the second electrodes 130 is configured to transmit a scan signal, while the other one of the first electrodes 120 and the second electrodes 130 is configured to receive a sensing signal. The touch panel 100 may further include a plurality of wires CL. The wires CL are connected to one of the first electrodes 120 or one of the second electrodes 130 respectively for transmission of signals.

The first electrodes 120, the second electrodes 130 and the wires CL are on the same side of the substrate 110, and the first connection portions 124 and the second connection portions 134 cross each other. In order to allow the first electrodes 120 and the second electrodes 130 to be electrically independent, the insulating layer 140 is located between the first connection portions 124 and the second connection portions 134. Therefore, the first connection portions 124 may be prevented from contacting the second connection portions 134 at the intersections of the first connection portions 124 and the second connection portions 134 to make the first electrodes 120 electrically insulated from the second electrodes 130.

The insulating layer 140 may be, for example, a patterned insulating layer. Specifically, the insulating layer 140 may include a plurality of insulating patterns 142. The insulating patterns 142 are, but not limited to be, disposed between the first connection portions 124 and the second connection portions 134 respectively.

In the embodiment, the first electrodes 120, the second electrodes 130, the insulating layer 140 and the wires CL are disposed on an inner surface SI of the substrate 110. The substrate 110 may serve as a cover plate, and an outer surface SO of the substrate 110 may serve as a touch sensing surface. In other words, a touch object such as a finger or touch pen is in contact with the outer surface SO of the substrate 110 for touch sensing. The touch panel 100 may further include a decorative layer DL to have aesthetic appeal and cover neighbouring circuits (the wires CL, for example). In a case that the substrate 110 serve as the cover plate, the decorative layer DL may be disposed on the substrate 110 and expose the first electrodes 120, the second electrodes 130 and the insulating layer 140. In addition, the decorative layer DL may cover a portion of the first electrodes 120 overlapping the wires CL and a portion of the second electrodes 130 overlapping the wires CL. In another embodiment, the touch panel 100 may further include the cover plate (not shown). The cover plate covers the substrate 110, the first electrodes 120, the second electrodes 130, the insulating layer 140 and the wires CL, and the decorative layer DL may be disposed on the cover plate. The decorative layer DL is made from, but not limited to, a shading material such as coloured ink.

In order to avoid damaging visual effects of the touch panel 100, the first electrodes 120 and the second electrodes 130 are made using a light-penetrable conductive layer. The light-penetrable conductive layer may include a transparent conductive layer and a metal mesh layer. The material of the transparent conductive layer may include a metal oxide, a carbon nano tube, a metal nanowire, graphene, silicone or other suitable transparent conductive materials. In addition, the metal mesh layer may be formed by patterning a single layer of a metal layer to form a plurality of light-transmissive openings O in the metal layer (see FIG. 1) or by stacking multiple layers of metal layers and then patterning the metal layers to form the light-transmissive openings O in the metal layers. Although a metal material has low optical transmittance, the metal mesh layer allows light to pass through by forming the light-transmissive openings O in the metal layer(s) through the patterning process. In addition, by controlling a size or number of the openings O in the metal mesh layer, the metal mesh layer has needed optical transmittance or needed aperture ratio. Besides, controlling a line width W (see FIG. 1) of the metal mesh layer mitigates the problem of metal wires being perceived to reduce the negative influence on visual effects. For example, the line width W of the metal mesh layer may, but not limited to, fall within a range from 1 µm to 6 µm.

According to an embodiment of the invention, the first electrodes 120 and the second electrodes 130 include the metal mesh layer and the transparent conductive layer, and at least one of the first connection portions 124 and the second connection portions 134 includes the metal mesh layer. Specifically, the first electrodes 120 and the second electrodes 130 are formed of at least one metal mesh layer and at least one transparent conductive layer, and respective numbers of the metal mesh layers and the transparent conductive layers may be equal to or more than one. In addition, the metal mesh layer may form the first connection portions 124 or the second connection portions 134. In a case that the number of the metal mesh layers is two, the two metal mesh layers may form the first connection portions 124 and the second connection portions 134 respectively (descriptions follow).

In the embodiment, the second connection portions 134 are formed of a metal mesh layer MM, and the first pad portions 122, the first connection portions 124 and the second pad portions 132 are formed of a transparent conductive layer TC. It is noteworthy that to make the illustration easy, the openings O of the metal mesh layer MM are omitted from FIGS. 2A and 2B, so the second connection portions 134 look like a continuous conductive structure.

The manufacturing method of the touch panel 100 may include the following steps. Firstly, the decorative layer DL is formed on the inner surface SI of the substrate 110. Secondly, the first pad portions 122, the first connection portions 124 and the second pad portions 132 are formed on the inner surface SI of the substrate 110. Then, the insulating patterns 142 are formed on the first connection portions 124. Afterwards, the second connection portions 134 and the wires CL are formed, and each of the second connection portions 134 crosses one of the insulating patterns 142 to connect the two adjacent second pad portions 132, and each of the wires CL is disposed on the decorative layer DL and connected to a corresponding first pad portion 122 or a corresponding second pad portion 132.

If each of the second connection portions 134 is formed of a transparent conductive material, a line width of each of the second connection portions 134 needs to become larger to reduce impedance; however, an overlapping area between the first connection portions 124 and the second connection portions 134 increases as well. An increase in the overlapping area results in a rise in the capacitance at the intersections of the first connection portions 124 and the second connection portions 134, thus lowers a signal-to-noise ratio and influences detection accuracy. By forming each of the second connection portions 134 with the metal mesh layer MM, the overlapping area between the first connection portions 124 and the second connection portions 134 is an area of the metal mesh layer MM, so the capacitance at the intersections of the first connection portions 124 and the second connection portions 134 may decline effectively. A reduction in the capacitance at the intersections may raise the signal-to-noise ratio effectively, so the touch panel 100 may have good detection accuracy.

If each of the second connection portions 134 is formed of a single metal wire, a broken circuit happens to the whole second electrode 130 or resistance rises significantly as long as a broken circuit or over etching occurs in the process. By forming each of the second connection portions 134 with the metal mesh layer MM, the whole second electrode 130 can still perform signal transmission even though a broken circuit happens to a metal wire, and moreover, the over etching of a metal wire has a slight influence on the impedance variations of the whole second electrode 130. Accordingly, forming each of the second connection portions 134 with the metal mesh layer MM helps enhance the reliability, yield rate and production of the touch panel 100. Besides, since the metal mesh layer MM may be formed together with the wires CL, the effect of simplifying the process and reducing the cost can be achieved.

The aperture ratio of the metal mesh layer MM of each of the second connection portions 134 may be designed according to a size of the overlapping area between the second connection portion 134 and the corresponding first connection portion 124. For example, the aperture ratio of the metal mesh layer MM of each of the second connection portions 134 may be equal to or less than 95%. In other words, a ratio of the area occupied by the metal wires in each of the second connection portions 134 to an entire area of the second connection portion 134 (see an area of the dashed area in FIG. 1 where the metal grid is encircled) may be equal to or more than 5%.

It is noted that the manufacturing sequence of the elements above, the number and shape of each element, and the relative positional relationship between the elements may vary with demand, but are not limited to what is shown in FIGS. 1 to 2B. For example, the second connection portions 134 and the wires CL may be firstly formed on the inner surface SI of the substrate 110. Secondly, the insulating patterns 142 are formed on the second connection portions 134. Then, the first pad portions 122, the first connection portions 124 and the second pad portions 132 are formed, and each of the first connection portions 124 crosses one of the insulating patterns 142 to connect two adjacent first pad portions 122.

Figure 3A:
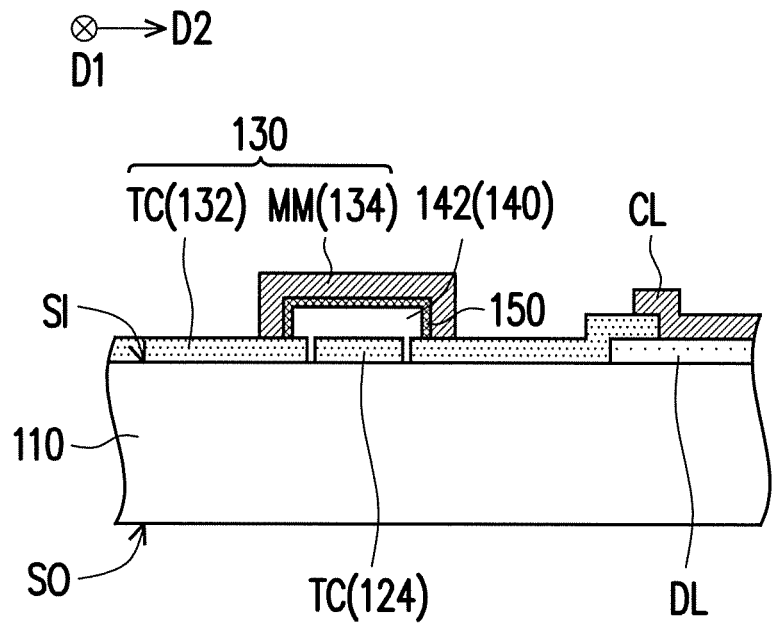
FIGS. 3A and 3B are second cross-sectional views of the section line A-A' and the section line B-B' in FIG. 1 respectively.
Figure 3B:
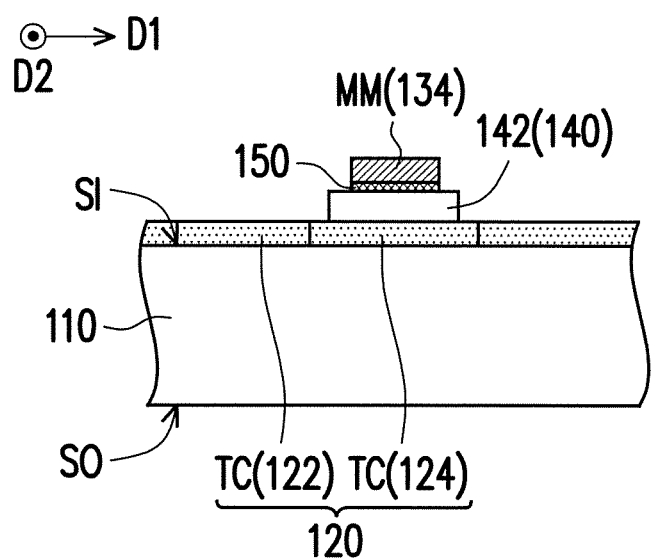
Figure 4A:
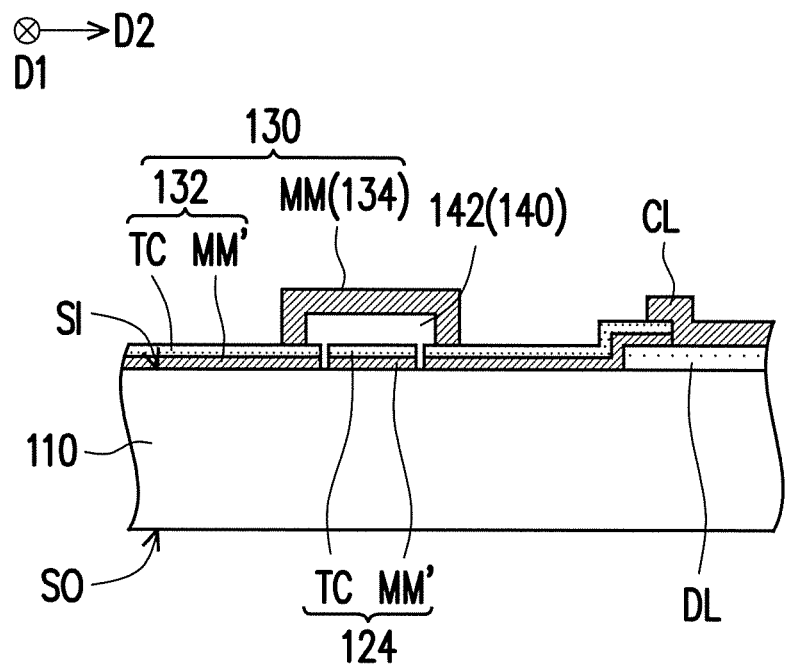
FIGS. 4A and 4B are third cross-sectional views of the section line A-A' and the section line B-B' in FIG. 1 respectively.
Figure 4B:
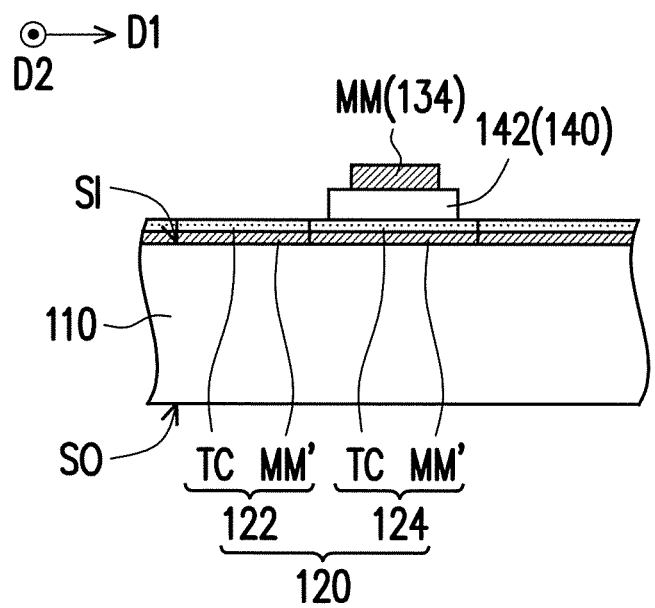
Figure 5A:
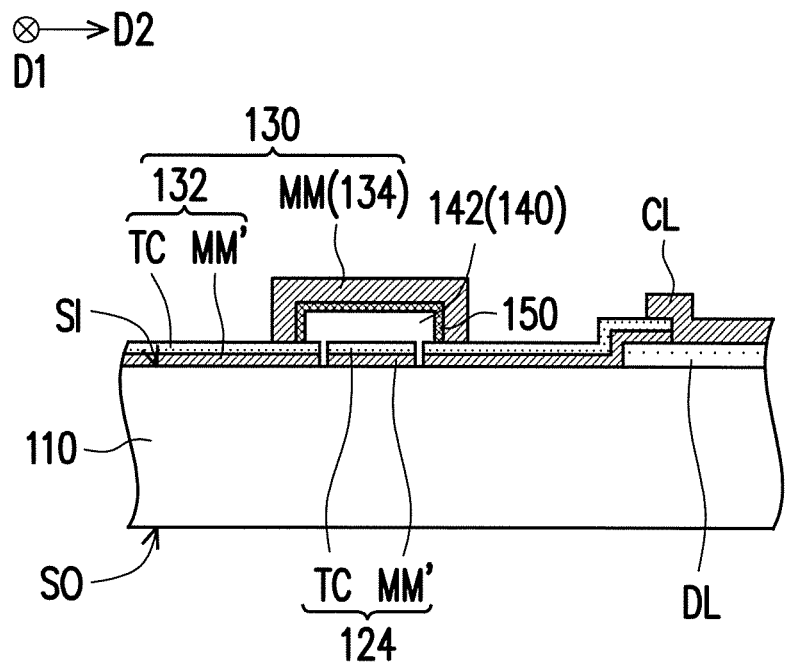
FIGS. 5A and 5B are fourth cross-sectional views of the section line A-A' and the section line B-B' in FIG. 1 respectively.
Figure 5B:
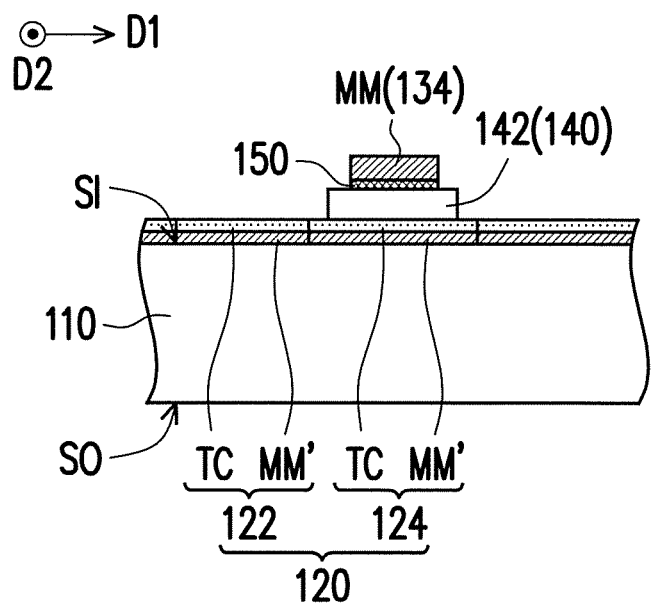

FIGS. 3A to 5B illustrate other sectional patterns of the touch panel in FIG. 1 with the same element denoted by the same reference numeral. Redundant descriptions are not repeated any longer. FIGS. 3A and 3B are second cross-sectional views of the section line A-A' and the section line B-B' in FIG. 1 respectively. FIGS. 4A and 4B are third cross-sectional views of the section line A-A' and the section line B-B' in FIG. 1 respectively. FIGS. 5A and 5B are fourth cross-sectional views of the section line A-A' and the section line B-B' in FIG. 1 respectively. Similar to the representations of FIGS. 2A and 2B, the openings of the metal mesh layer are omitted from FIGS. 3A to 5B.

Referring to FIGS. 1, 3A and 3B, the touch panel 100 may further include a shielding layer 150 that is disposed on a side of the metal mesh layer MM (the second connection portion 134). Specifically, the shielding layer 150 is disposed on the side of the metal mesh layer MM facing a user in order to reduce metal reflection, so the visibility of the metal mesh layer MM further declines. In the embodiment, the substrate 110 serves as the cover plate, for example, with the outer surface SO of the substrate 110 as the touch sensing surface. Accordingly, the shielding layer 150 is disposed on a surface of the metal mesh layer MM facing the substrate 110 and located between the insulating pattern 142 and the second connection portion 134. In another embodiment describing the touch panel 100 further including the cover plate, the shielding layer 150 is disposed on the surface of the metal mesh layer MM facing the cover plate, so the second connection portion 134 is located between the shielding layer 150 and the insulating pattern 142. The shielding layer 150 may be, but not limited to, made from a metal oxide, a metal nitride, a metal hydride, coloured ink, a scattering structure or an anti-reflective optical film.

Referring to FIGS. 1, 4A and 4B, in addition to including the metal mesh layer MM and the transparent conductive layer TC, the first electrodes 120 and the second electrodes 130 of the touch panel 100 may further include a metal mesh layer MM'. In addition, the first pad portions 122, the first connection portions 124 and the second pad portions 132 are formed by stacking the transparent conductive layer TC and the metal mesh layer MM'. Accordingly, the entire impedance of the first electrodes 120 and of the second electrodes 130 may further decrease. The decrease in the entire impedance boosts the charging speed of the touch panel 100 and thus enhances the sensitivity of the touch panel 100.

The metal mesh layer MM and the metal mesh layer MM' may have identical or different materials. Besides, the metal mesh layer MM and the metal mesh layer MM' may have an identical or different shape or size of a grid. In addition, the aperture ratio and the shape or size of the grid of the metal mesh layer MM' may have regional differences depending on demand. For example, the aperture ratio of the metal mesh layer MM' of the first pad portions 122 and the aperture ratio of the metal mesh layer MM' of the second pad portions 132 may be equal to or more than 95%. Besides, the aperture ratio of the metal mesh layer MM' of the first connection portions 124 may be equal to or less than 95%. However, the invention is not limited to the situations described above.

In the embodiment, the metal mesh layer MM' is formed earlier on the substrate 110 than the transparent conductive layer TC. The transparent conductive layer TC covering the metal mesh layer MM' may protect the metal mesh layer MM', for example, to prevent oxidization of the metal mesh layer MM'. However, in another embodiment, the transparent conductive layer TC may be formed earlier on the substrate 110 than the metal mesh layer MM'. In addition, the second connection portions 134 may also be formed earlier on the substrate 110 than the first pad portions 122, the first connection portions 124 and the second pad portions 132, and the wires CL may be formed together with the metal mesh layer MM' of the first pad portions 122, the metal mesh layer MM' of the first connection portions 124 and the metal mesh layer MM' of the second pad portions 132 to reduce the number of processes, but the invention is not limited to the situations described above.

Referring to FIGS. 1, 5A and 5B, under the structures in FIGS. 4A and 4B, the touch panel 100 may further include the shielding layer 150 shown in FIGS. 3A and 3B to reduce the visibility of the metal mesh layer MM. In another embodiment, the shielding layer 150 may also be disposed on the side of the metal mesh layer MM' facing the user to reduce the visibility of the metal mesh layer MM'.

Figure 6:
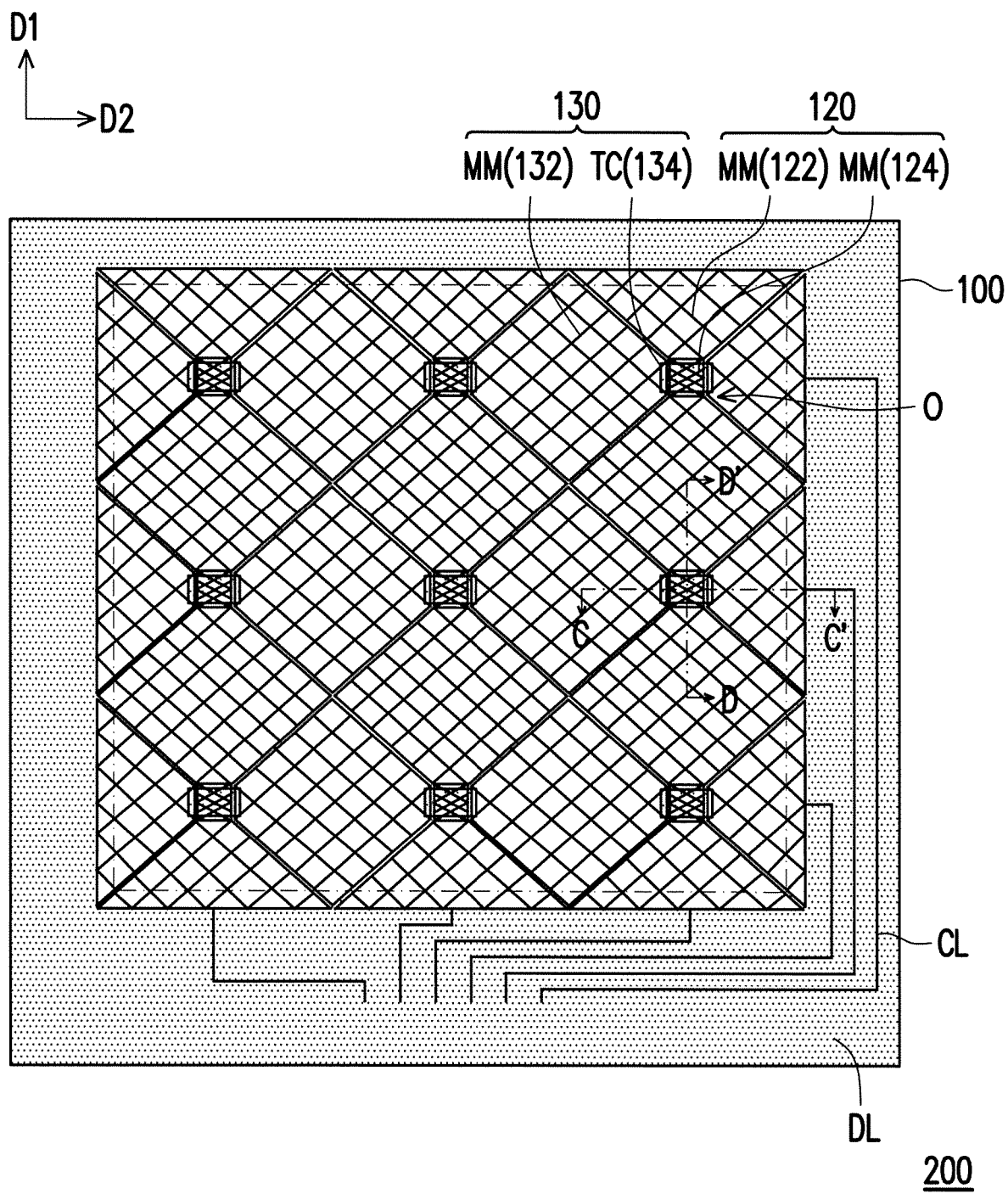
FIG. 6 is a bottom view of a touch panel according to a second embodiment of the invention.
Figure 7A:
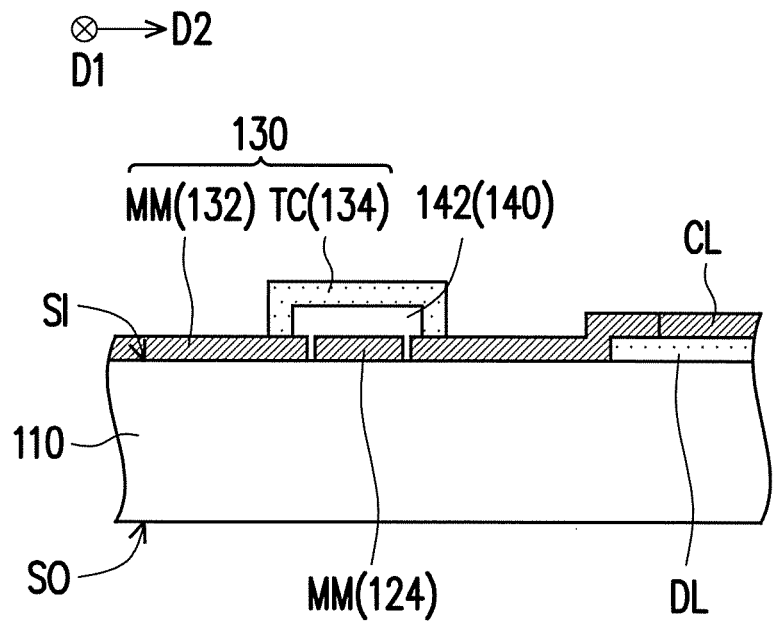
FIGS. 7A and 7B are first cross-sectional views of a section line C-C' and a section line D-D' in FIG. 6 respectively.
Figure 7B:
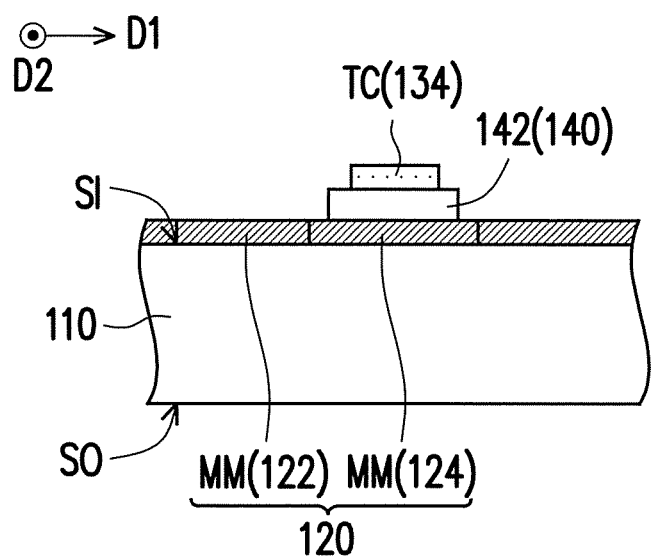

FIG. 6 is a bottom view of a touch panel according to the second embodiment of the invention. FIGS. 7A and 7B are first cross-sectional views of a section line C-C' and a section line D-D' in FIG. 6 respectively. Similar to the representation of FIG. 1, FIG. 6 does not show the insulating layer to clear indicate the relative positional relationship between the first electrodes and the second electrodes. Accordingly, reference is made to FIGS. 7A and 7B concerning the insulating layer 140 according to the second embodiment. Besides, similar to the representations of FIGS. 2A and 2B, the openings of the metal mesh layer are omitted from FIGS. 7A and 7B.

Referring to FIGS. 6 to 7B, a touch panel 200 according to the second embodiment of the invention is similar to the touch panel 100 in FIGS. 1 to 2B with the same element denoted by the same reference numeral. Redundant descriptions are not repeated any longer. The main differences between the touch panel 200 and the touch panel 100 are described below.

For the touch panel 200, the first pad portions 122, the first connection portions 124 and the second pad portions 132 are formed of the metal mesh layers MM, and the second connection portions 134 are formed of the transparent conductive layers TC.

Under the structure, the first pad portions 122, the first connection portions 124 and the second pad portions 132 may be formed together with the wires CL to reduce the number of processes. After the first pad portions 122, the first connection portions 124, the second pad portions 132 and the wires CL are formed, the insulating layer 140 and the second connection portions 134 may be formed sequentially. However, the manufacturing sequence of the touch panel 200 is not limited to the situation described above. In an embodiment, the second connection portions 134 may be firstly formed, followed by the insulating layer 140. Subsequently, the first pad portions 122, the first connection portions 124, the second pad portions 132 and the wires CL are formed.

In the embodiment, since the first connection portions 124 include the metal mesh layer MM, the capacitance at the intersections of the first connection portions 124 and the second connection portions 134 may decline effectively, and the touch panel 200 may have good detection accuracy. In addition, if the transparent conductive layer TC is replaced with the metal mesh layer MM to form the first pad portions 122, the first connection portions 124 and the second pad portions 132, the entire impedance of the first electrodes 120 and of the second electrodes 130 may decline to enhance the sensitivity of the touch panel 200.

The aperture ratio of the metal mesh layer MM and the shape or size of the grid of the metal mesh layer MM may have regional differences depending on demand. For example, the aperture ratio of the metal mesh layer MM of the first pad portions 122 and the aperture ratio of the metal mesh layer MM of the second pad portions 132 may be equal to or more than 95%. Besides, the aperture ratio of the metal mesh layer MM of the first connection portions 124 may be equal to or less than 95%. However, the invention is not limited to the situations above.

Figure 8A:
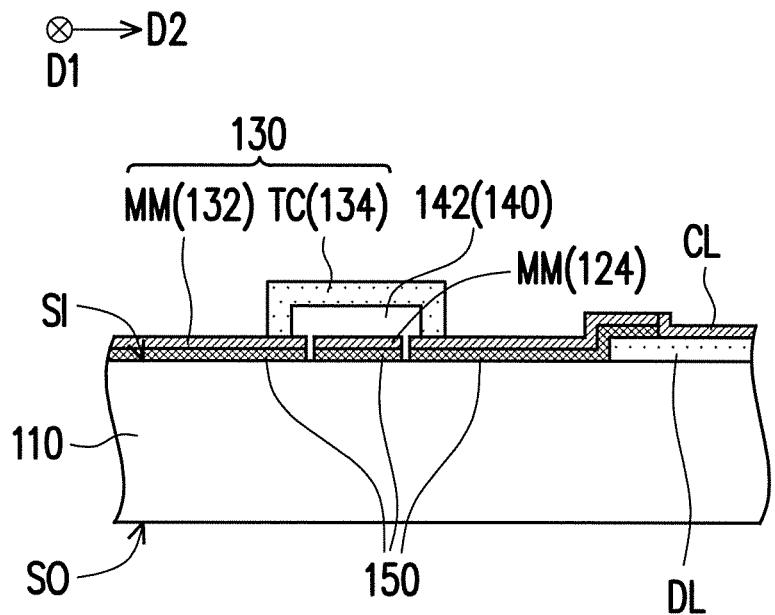
FIGS. 8A and 8B are second cross-sectional views of the section line C-C' and the section line D-D' in FIG. 6 respectively.
Figure 8B:
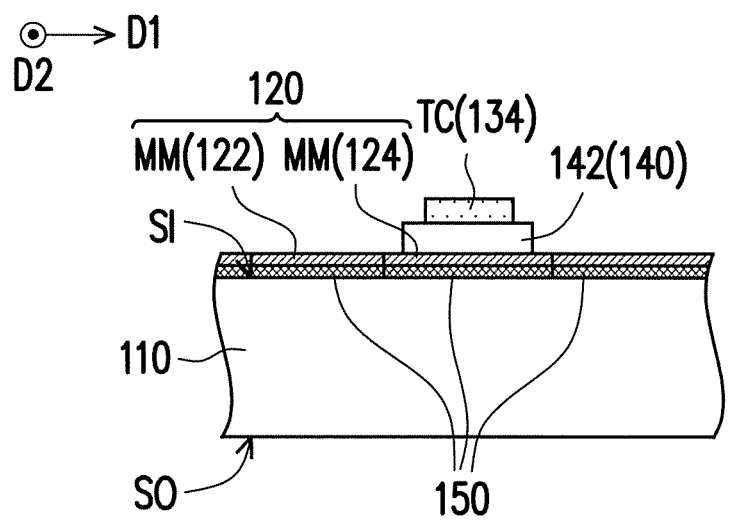
Figure 9A:
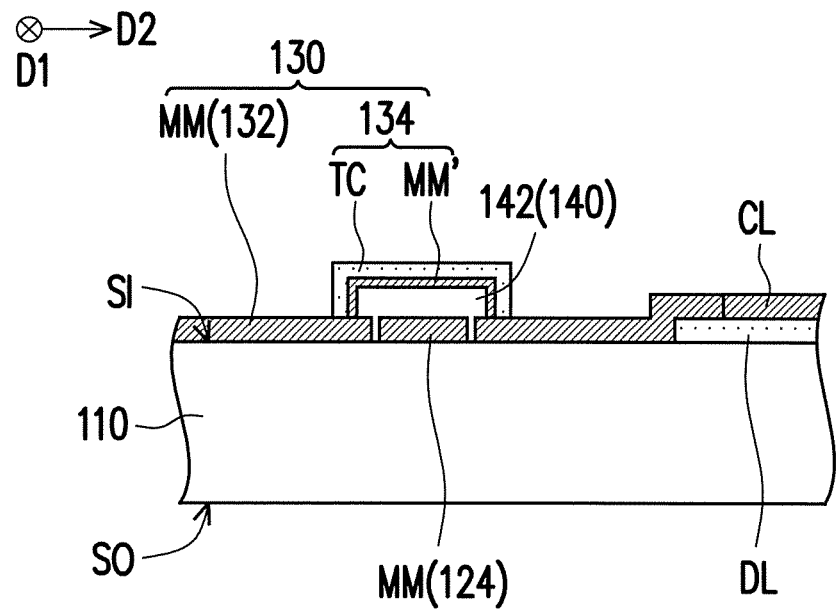
FIGS. 9A and 9B are third cross-sectional views of the section line C-C' and the section line D-D' in FIG. 6 respectively.
Figure 9B:
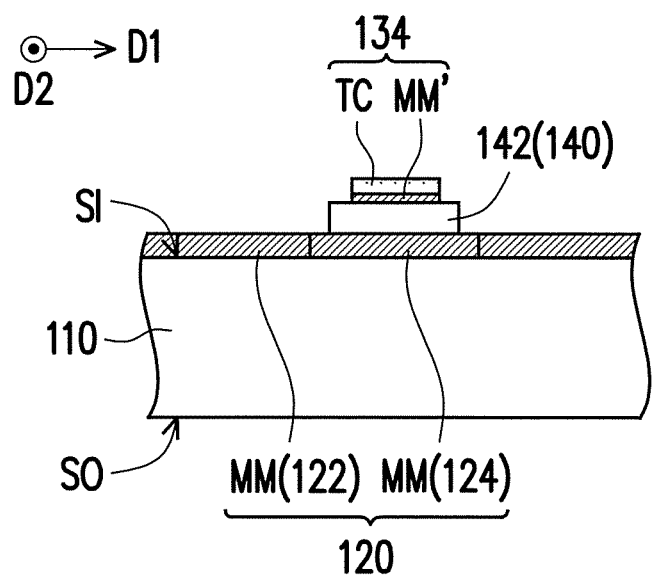
Figure 10A:
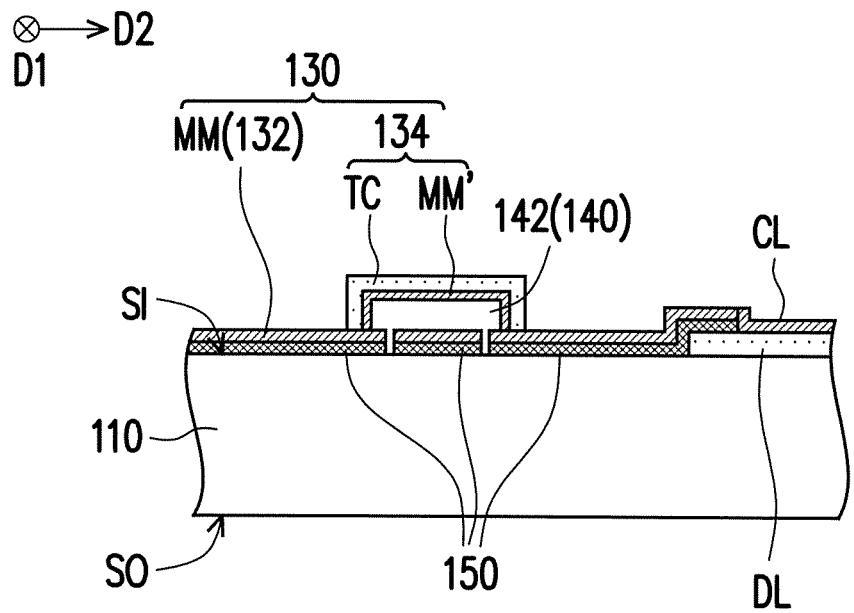
FIGS. 10A and 10B are fourth cross-sectional views of the section line C-C' and the section line D-D' in FIG. 6 respectively.
Figure 10B:
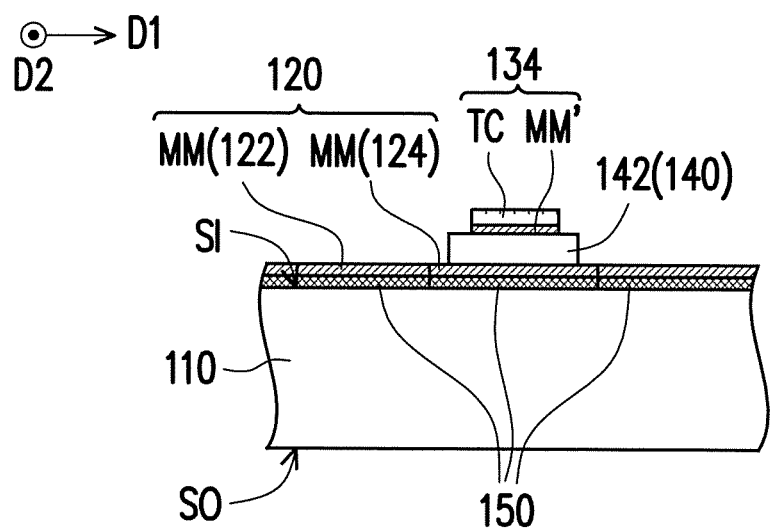

FIGS. 8A to 10B serve to illustrate other types of sectional patterns of the touch panel in FIG. 6 with the same element denoted by the same reference numeral. Redundant descriptions are not repeated any longer. FIGS. 8A and 8B are second cross-sectional views of the section line C-C' and the section line D-D' in FIG. 6 respectively. FIGS. 9A and 9B are third cross-sectional views of the section line C-C' and the section line D-D' in FIG. 6 respectively. FIGS. 10A and 10B are fourth cross-sectional views of the section line C-C' and the section line D-D' in FIG. 6 respectively. Similar to the representations of FIGS. 7A and 7B, the openings of the metal mesh layer are omitted from FIGS. 8A to 10B.

Referring to FIGS. 6, 8A and 8B, the touch panel 200 may further include the shielding layer 150 that is disposed on the side of the metal mesh layer MM (the first pad portions 122, the first connection portions 124 and the second pad portions 132). In the embodiment, the substrate 110 serves as the cover plate, for example, with the outer surface SO of the substrate 110 as the touch sensing surface. Accordingly, the shielding layer 150 is disposed on the surface of the metal mesh layer MM facing the substrate 110 and located between the first pad portion 122 and the substrate 110, between the first connection portion 124 and the substrate 110 and between the second pad portion 132 and the substrate 110. In the other embodiments describing the touch panel 200 further including the cover plate, the shielding layer 150 is disposed on the surface of the metal mesh layer MM facing the cover plate to allow the first pad portion 122, the first connection portion 124 and the second pad portion 132 to be located between the shielding layer 150 and the substrate 110.

Referring to FIGS. 6, 9A and 9B, in addition to including the metal mesh layer MM and the transparent conductive layer TC, the first electrodes 120 and the second electrodes 130 of the touch panel 200 may further include the metal mesh layer MM'. In addition, the second connection portions 134 are formed by stacking the transparent conductive layers TC and the metal mesh layers MM'. Accordingly, the impedance of the second connection portions 134 may further decrease.

In the embodiment, the metal mesh layer MM' is formed earlier on the insulating layer 140 than the transparent conductive layer TC. The transparent conductive layer TC covering the metal mesh layer MM' may protect the metal mesh layer MM', for example, to lower the oxidization speed of the metal mesh layer MM'. However, in another embodiment, the transparent conductive layer TC is formed earlier on the insulating layer 140 than the metal mesh layer MM'. In addition, the second connection portions 134 may also be formed earlier on the substrate 110 than the first pad portions 122, the first connection portions 124 and the second pad portions 132, and the wires CL may be formed together with the metal mesh layer MM' of the second connection portions 134 to reduce the number of processes. However, the invention is not limited to the situations described above.

Referring to FIGS. 6, 10A and 10B, under the structures in FIGS. 9A and 9B, the touch panel 200 may further include the shielding layer 150 shown in FIGS. 8A and 8B to reduce the visibility of the metal mesh layer MM. In another embodiment, the shielding layer 150 may also be further disposed on the side of the metal mesh layer MM' facing the user to reduce the visibility of the metal mesh layer MM'.

In view of the foregoing, for the touch panel according to the embodiments of the invention, since at least one of the first connection portions and the second connection portions includes the metal mesh layer, the capacitance at the intersections of the first connection portions and the second connection portions may decrease to enhance detection accuracy. Accordingly, the touch panel according to the embodiments of the invention may have good detection accuracy. Compared with forming each of the first connection portions or the second connection portions with the single metal wire, forming each of the first connection portions or the second connection portions with the metal mesh layer boosts the reliability, yield rate and production of the touch panel. Besides, since the metal mesh layer may be formed together with the wires, the process is simplified, and the costs are lowered. In an embodiment, the visibility of the metal mesh layer may be further reduced by disposing the shielding layer. In another embodiment, the transparent conductive layer may be replaced with a stacking layer of the metal mesh layer and the transparent conductive layer to reduce the entire impedance and enhance the sensitivity of the touch panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
    a substrate;
    a plurality of first electrodes, disposed on the substrate, wherein each of the first electrodes comprises a plurality of first pad portions and a plurality of first connection portions, and each of the first connection portions directly contacts and connects two adjacent first pad portions;
    a plurality of second electrodes, disposed on the substrate, wherein each of the second electrodes comprises a plurality of second pad portions and a plurality of second connection portions, and each of the second connection portions directly contacts and connects two adjacent second pad portions; and
    an insulating layer, wherein the first electrodes and the second electrodes are located on the same side of the substrate, the first connection portions and the second connection portions cross each other, and the insulating layer is located between the first connection portions and the second connection portions, such that the first electrodes and the second electrodes are electrically insulated from each other,
    wherein the first electrodes and the second electrodes comprise a metal mesh layer and a transparent conductive layer, and at least one of the first connection portions and the second connection portions comprises the metal mesh layer.

2. The touch panel of claim 1, wherein the second connection portions are formed of the metal mesh layer, and the first pad portions, the first connection portions and the second pad portions are formed of the transparent conductive layer.

3. The touch panel of claim 1, wherein the first electrodes and the second electrodes comprise two metal mesh layers and the transparent conductive layer, the second connection portions are formed of one of the two metal mesh layers, and the first pad portions, the first connection portions and the second pad portions are formed by stacking the transparent conductive layer and the other one of the two metal mesh layers.

4. The touch panel of claim 1, wherein the first pad portions, the first connection portions and the second pad portions are formed of the metal mesh layer, and the second connection portions are formed of the transparent conductive layer.

5. The touch panel of claim 1, wherein the first electrodes and the second electrodes comprise two metal mesh layers and the transparent conductive layer, the first pad portions, the first connection portions and the second pad portions are formed of one of the two metal mesh layers, and the second connection portions are formed by stacking the transparent conductive layer and the other one of the two metal mesh layers.

6. The touch panel of claim 1, wherein a line width of the metal mesh layer falls within a range from 1 µm to 6 µm.

7. The touch panel of claim 1, wherein an aperture ratio of the metal mesh layer of at least one of the first connection portions and the second connection portions is equal to or less than 95%.

8. The touch panel of claim 1, wherein an aperture ratio of the metal mesh layer of the first pad portions and the second pad portions is equal to or more than 95%.

9. The touch panel of claim 1, further comprising:
a shielding layer, disposed on a side of the metal mesh layer.

10. The touch panel of claim 1, further comprising:
a decorative layer, disposed on the substrate and exposing the first electrodes, the second electrodes and the insulating layer.

* * * * *